(12) United States Patent
Oka et al.

(10) Patent No.: US 6,265,986 B1
(45) Date of Patent: Jul. 24, 2001

(54) DISPLAY SYSTEM

(75) Inventors: Kouichi Oka; Kazuhiro Suzuki; Tomo Baba; Yasuaki Kuwata; Hiroshi Arisawa, all of Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/365,805

(22) Filed: Aug. 3, 1999

(30) Foreign Application Priority Data

Aug. 28, 1998 (JP) ................................................ 10-244195

(51) Int. Cl.[7] ........................................................... G08B 5/36
(52) U.S. Cl. ............................ 340/815.52; 345/4; 345/205
(58) Field of Search ......................... 340/815.52, 815.47, 340/815.45, 525; 345/3–5, 113, 204, 205, 901, 903, 905; 349/149, 150; 361/681

(56) References Cited

U.S. PATENT DOCUMENTS

| | | | | |
|---|---|---|---|---|
| 4,341,980 | * | 7/1982 | Noguchi et al | 315/169.1 |
| 4,836,651 | * | 6/1989 | Anderson | 350/334 |
| 5,189,539 | * | 2/1993 | Suzuki | 359/87 |
| 5,670,994 | * | 9/1997 | Kawaguchi et al. | 345/206 |
| 5,986,622 | * | 11/1999 | Ong | 345/1 |

FOREIGN PATENT DOCUMENTS 2-254420    10/1990    (JP) .

* cited by examiner

*Primary Examiner*—Donnie L. Crosland
(74) *Attorney, Agent, or Firm*—Oliff & Berridge, PLC

(57) ABSTRACT

In a small display system in which the area of each of a display device and a driving device is approximately reduced to the area of an image display part, the display device having the image display part and the driving device having a driving IC for driving the display device can be attached to or detached from each other. Display device-side electrode terminals connected to lines for driving individual display pixels of the display device are provided on the reverse surface of the display device opposite to the image display part. Driving device-side electrode terminals corresponding to the respective display device-side electrode terminals are provided on the display device connecting part of the driving device. When the display device is attached to the driving device, both the driving device-side electrode terminals and the display device-side electrode terminals are electrically connected so that an image can be displayed on the display device by the driving device.

25 Claims, 9 Drawing Sheets

FIG.1(A)
FIG.1(B)
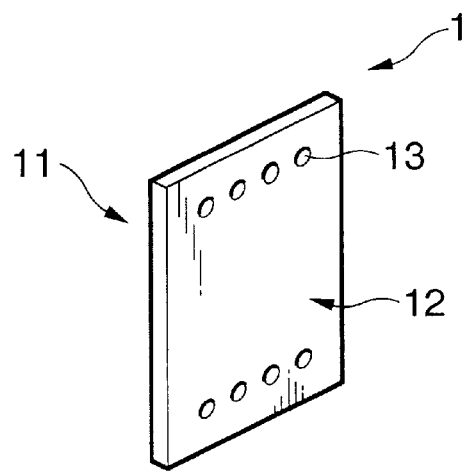
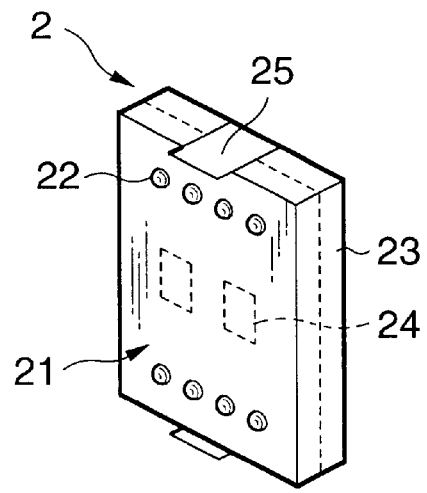
FIG.2(A)
FIG.2(B)
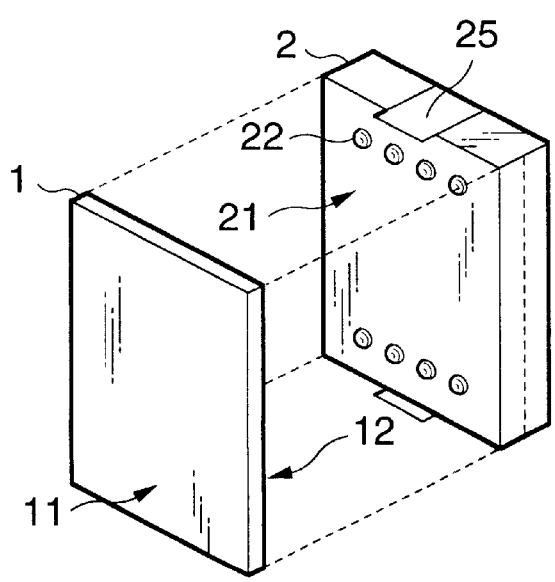
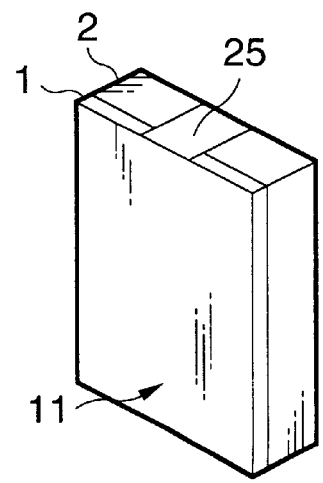

DISPLAY SYSTEM

BACKGROUND OF THE INVENTION

1. Field of the Invention

The present invention relates to a display system in which a flat display de vice and a driving part therefore can be detachably attached to each other.

2. Description of the Related Art

For example, a liquid crystal display is well known as a flat display system. In the case of the liquid crystal display, it is general to directly connect its driving circuit to its display substrate by using TAB mounting or flip chip mounting. In this method, a driving device including one set of driving circuits is needed for one set of displays. For this reason, there is the problem that the liquid crystal device becomes an expensive device having a large area, a heavy weight and a large thickness. Because of this problem, it has been impossible to apply the method to, for example, an application which uses a plurality of displays.

As an art which solves the above-described problem, there is a display system in which its display device part and its driving device part are separated from each other and a plurality of display devices having no driving devices are driven by one set of driving devices. FIG. 17 is an explanatory view showing one example of a conventional display system. In FIG. 17, reference numeral 71 denotes a display device, reference numeral 72 denotes driving devices and reference numeral 73 denotes a binding part. This display system includes the plurality of display devices 71 and one driving device 72 having the binding part 73. The display devices 71 are connected together in a book-like form by the binding part 73.

In the above-described construction, since the display devices 71 are not integrated with the driving device 72, each of the display devices 71 can be formed as a thin and light-weight display device and is easy to handle. For this reason, it is possible to construct the display system using the plurality of display devices 71 as shown in FIG. 17.

FIG. 18 is a perspective view showing one example of electrical connection means for the display device 72 and the driving devices 71 in one example of the conventional display system. In FIG. 18, reference numeral 74 denotes electrode terminals, and reference numeral 75 denotes a card edge connector. A system disclosed in, for example, Japanese Patent Laid-Open No. 254420/1990, which uses the card edge connector 75 of the type shown in FIG. 18, is known as means for electrically connecting the display devices 71 and the driving device 72 in the display system shown in FIG. 17.

In this system, the electrode terminals 74 are provided at an end portion of each of the display devices 71, and the end portion at which the electrode terminals 74 are provided is inserted into the card edge connector 75. Electrodes which respectively correspond to the electrode terminals 74 of each of the display devices 71 are disposed in the card edge connector 75, and when one display device 71 is inserted into the card edge connector 75, the electrodes of both the card edge connector 75 and the display device 71 slide into contact with each other to provide electrical connection.

However, this electrical connection system which uses the card edge connector 75 has the disadvantage that because a large area in which to dispose the electrode terminals 74 is needed around the image display area of the display devices 71, the area of the display devices 71 is large. Even in a display system such as that shown in FIG. 17, the binding part 73 needs a construction which corresponds to the card edge connector 75, so that the area of the driving device 72 is large and the entire display system is large.

Furthermore, since the display devices 71 are attached and detached by a multiplicity of times, the electrode terminals 74 repeatedly slide on the electrode terminals in the card edge connector 75. For this reason, the electrode terminals 74 of the display devices 71 need the reliability of electrical connection and wear resistance. Therefore, the electrode terminals 74 must be covered with Au plating having an intermediate metallic layer. However, there is the problem that it is difficult in terms of techniques and costs to apply Au plating or the like to an ITO layer or an Al layer which is generally used for display board lines.

SUMMARY OF THE INVENTION

The present invention has been made in view of the above-described problems, and its object is to provide a small display system in which the areas of a display device and a driving device are reduced.

In accordance with the present invention, the re is provided a display system which comprises a flat display device having an image display part, and a driving device having a driving circuit for displaying an image on the display device, the display device and the driving device being constructed to be detachably attached to each other. In the display system, an electrode terminal of the display device is disposed on the reverse surface of the display device opposite to the image display part, while an electrode terminal of the driving device is disposed flatly and relatively symmetrically to the electrode terminal of the display device, and the display device and the driving device are aligned to each other to electrically connect both electrode terminals and cause the display device to display an image.

Accordingly, unlike the conventional display system, there is no need to provide an extra area for electrical connection around the display device, and the areas of the display device and the driving device can be reduced. In addition, since a sliding operation which cannot be avoided with the conventional card edge connector does not occur while the display device and the driving device are being electrically connected to each other, none of the electrode terminals of the display device and the driving device needs wear resistance, whereby it is possible to realize a construction which is technically simple and inexpensive.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIGS. 1(A) and 1(B) are perspective views showing examples of a display device and a driving device in an embodiment of the display system according to the present invention;

FIGS. 2(A) and 2(B) are perspective views showing the states of attachment and detachment of the display device and the driving device in the embodiment of the display system according to the present invention;

DESCRIPTION OF THE PREFERRED EMBODIMENTS

Figure 3:
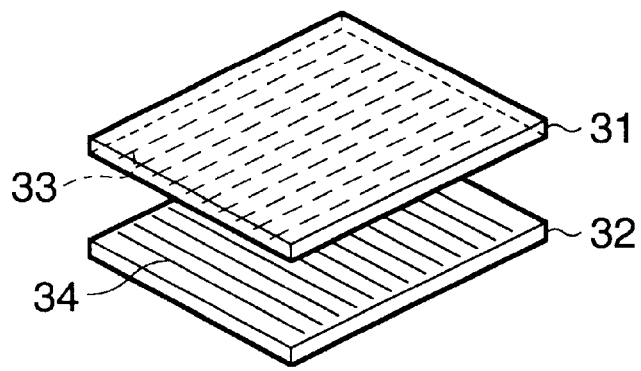
FIG. 3 is an exploded perspective view showing one example of an image display part of a display device.

FIGS. 1(A) and 1(B) are perspective views showing examples of a display device and a driving device according to an embodiment of the present invention. FIGS. 2(A) and 2(B) are perspective views showing the states of attachment and detachment of the display device and the driving device. In FIGS. 2 (A) and 2 (B), reference numeral 1 denotes a display device, reference numeral 2 denotes a driving device, reference numeral 11 denotes an image display surface, reference numeral 12 denotes the reverse surface of the display device 1 opposite to the image display surface 11, reference numeral 13 denotes display device-side electrode terminals, reference numeral 21 denotes a display device connecting part, reference numeral 22 denotes driving device-side electrode terminals, reference numeral 23 denotes a driving circuit part, reference numeral 24 denotes a driving IC, and reference numeral 25 denotes securing parts. As shown in FIGS. 1(A) and 1(B), the display device according to the present invention includes the display device 1 having an image display part and the driving device 2 having the driving IC 24 for driving the 1 in such a manner that the display device 1 can be detachably attached to the driving device 2.

FIG. 1(A) shows one example of the display device 1. The display device 1 has a flat shape, and its one surface is the image display surface 11 having the image display part. Provided on the reverse surface 12 of the display device 1 opposite to the image display surface 11 are the display device-side electrode terminals 13 for providing electrical connection to the driving device 2. Although the display device-side electrode terminals 13 are arranged in two lines in the example shown in FIGS. 1(A) and 1(B), the arrangement and number of the display device-side electrode terminals 13 are arbitrary as will be described later.

FIG. 1(B) shows one example of the driving device 2. The driving device 2 includes in a built-in form the driving circuit part 23 including the driving IC 24 for driving the display device 1. The display device connecting part 21 having a surface opposed to the display device 1 is provided with the driving device-side electrode terminals 22 for providing electrical connection to the display device 1. The driving device-side electrode terminals 22 are disposed flatly and relatively symmetrically to the display device-side electrode terminals 13, and are electrically connected to the display device-side electrode terminals 13. Incidentally, image data to be displayed on the display device 1 are stored in a memory in the driving circuit part 23 or transmitted from an external device (not shown). The display device connecting part 21 may be made of a printed circuit board separate from the driving circuit part 23, or may also use one surface of a printed circuit board whose other surface is provided with the driving circuit part 23. of course, the display device connecting part 21 may be made of not a printed circuit board but another circuit board such as a ceramic circuit board.

The driving device 2 is provided with the securing parts 25 for securely holding the display device 1 when the display device 1 is attached to the driving device 2. In the example shown in FIG. 2(B), each of the securing parts 25 is made of a plate-shaped member, and holds the display device 1 attached to the driving device 2 on one side of the display device 1 by frictional force, the elastic force of the securing part 25 and the like. A claw-shaped portion may also be provided on the extending end of the plate-shaped member to engage with the display device 1. Incidentally, it is desirable to arrange the securing parts 25 to prevent them as completely as possible from covering the display of the image display part of the display device 1 when the display device 1 is attached to the driving device 2.

The display device 1 and the driving device 2 can be separated from each other as shown in FIG. 2(A). If the display device 1 is aligned with the driving device 2 in a separated state, the display device 1 can be attached to the driving device 2 as shown in FIG. 2(B). At this time, the display device-side electrode terminals 13 provided on the reverse surface 12 of the display device 1 opposite to the image display surface 11 and the driving device-side electrode terminals 22 provided in the display device connecting part 21 of the driving device 2 are at least brought into abutment with each other to provide electrical connection therebetween. Thus, an image can be displayed on the image display surface 11 of the display device 1 by the driving IC 24 incorporated in the driving circuit part 23. Incidentally, the attached display device 1 is held in its attached state by the securing parts 25 provided on the driving device 2.

In this manner, when the display device 1 is attached to the driving device 2, electrical connection is provided on the reverse surface 12 of the display device 1 opposite to the image display surface 11. Accordingly, the display device 1 does not need the conventional extra area for electrode terminals, and the driving device 2 does not need a large area such as that of a card edge connector. Accordingly, it is possible to construct a display system with a size approximately equal to the area of the image display surface 11 of the display device 1. In addition, since the display system does not have a slide portion such as that required in the conventional card edge connector, there is the advantage that it is not necessary to strictly consider the wear resistances of both electrode terminals 13 and 22.

The display device 1 and the driving device 2 can be separated from each other in the way of pulling them apart from each other. After that, another display device can be attached to the driving device 2. In this manner, one driving device 2 can cope with a plurality of display devices.

In addition, the display de vice 1 can also be used in a state of being detached from the driving device 2. For example, a display using ferroelectric liquid crystal can be used as the display device 1. In this case, since ferroelectric liquid crystal has a memory characteristic, a displayed image is held even in the state in which the display device 1 is detached from the driving device 2. If this memory characteristic is utilized, it is possible to apply the display system to various uses; for example, after an image is displayed on the display device 1, the display device 1 can be detached from the driving device 2 with the displayed image being held in an as-displayed state, or the displayed content of the detached display device 1 can be arranged together with that of another display device.

Figure 4:
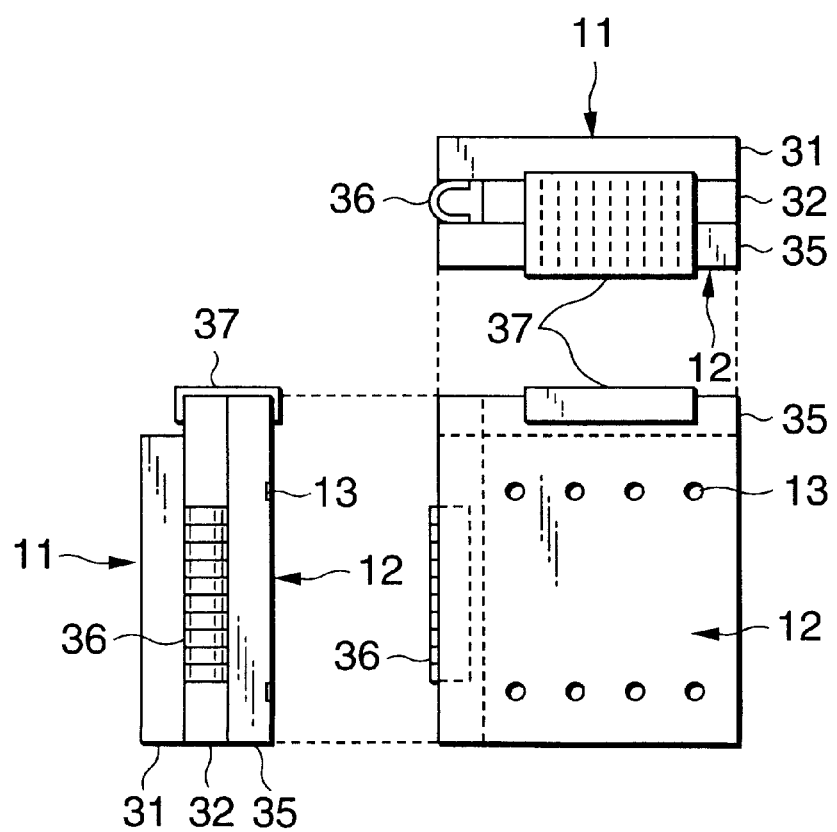
FIG. 4 is a three-side view showing a first example of the display device.
Figure 5:
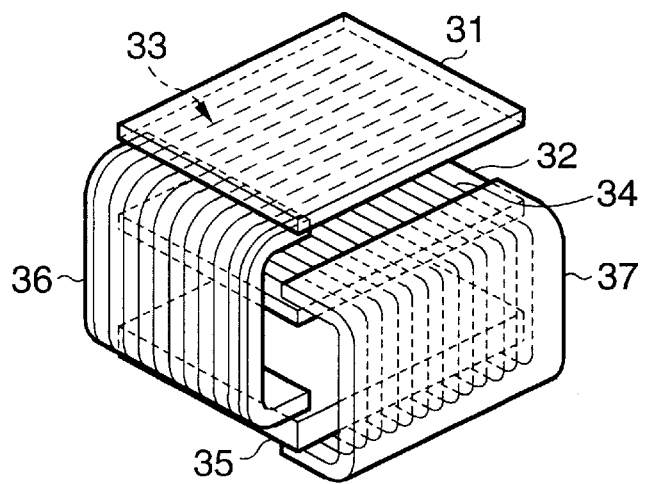
FIG. 5 is an explanatory view of the relation of electrical connection of the first example of the display device.

Each portion of the display system will be described below in further details. FIG. 3 is an exploded perspective view showing one example of the image display surface 11 of the display device 1, FIG. 4 is a three-side view showing a first example of the display device 1, and FIG. 5 is an explanatory view of the relation of electrical connect ion of the first example of the display device 1. In these figures, reference numeral 31 denotes a top substrate, reference numeral 32 denotes a bottom substrate, reference numeral 33 denotes top substrate lines, reference numeral 34 denotes bottom substrate lines, reference numeral 35 denotes a circuit board, and reference numerals 36 and 37 denote heat seal connectors. FIGS. 3, 4 and 5 show an example in which a simple matrix addressing type of ferroelectric liquid crystal display is used as a display. As shown in FIG. 3, this ferroelectric liquid crystal display has the top substrate 31 and the bottom substrate 32. The top substrate lines 33 made of ITO and disposed in parallel with one another are formed on the surface of the top substrate 31 opposed to the bottom substrate 32, and the other surface of the top substrate 31 is the image display surface 11. The bottom substrate lines 34 made of ITO and disposed in parallel in a direction perpendicular to the top substrate lines 33 are formed on the surface of the bottom substrate 32 opposed to the top substrate 31. Ferroelectric liquid crystal (not shown) is disposed between the lines 33 and 34 which cross at right angles to each other. If one of the top substrate lines 33 and one of the bottom substrate lines 34 are selected and driven, the plane of polarization of the ferroelectric liquid crystal between the driven lines varies to provide display for one pixel. An image can be displayed by selectively driving the liquid crystal by means of the driving IC 24 of the driving device 2 by using a matrix electrode made of the top substrate lines 33 and the bottom substrate lines 34.

It is to be noted that a substrate made of resin film or the like can be used as each of the top substrate 31 and the bottom substrate 32. If a printed circuit board or an FPC (flexible printed) circuit board which is as thin as approximately 0.3 to 1.0 mm or less and has flexibility is used as the circuit board 35, the display device 1 can be constructed as a display device having flexibility. Of course, if glass substrates are used as the top substrate 31 and the bottom substrate 32 and a rigid circuit board such as a thick printed circuit board is used as the circuit board 35, the display device 1 can also be constructed as a display device which is not deformed by external force.

In the present invention, as shown in FIG. 1(A) as well, since the display device-side electrode terminals 13 are provided on the reverse surface 12 of the display device 1 opposite the image display surface 11, it is necessary to extend the individual lines formed on the opposed surfaces of the top substrate 31 and the bottom substrate 32 to the display device-side electrode terminals 13. In this example, as shown in FIG. 4, the circuit board 35 is provided on the surface of the bottom substrate 32 opposite to the surface thereof opposed to the top substrate 31, and the display device-side electrode terminals 13 are provided on the circuit board 35. The top substrate lines 33 and the bottom substrate lines 34 (not shown) which are provided on the top substrate 31 and the bottom substrate 32 are electrically connected to the circuit board 35 by using the heat seal connectors 36 and 37.

Specifically, as shown in FIG. 5, the top substrate lines 33 formed on the surface of the top substrate 31 opposed to the bottom substrate 32 are electrically connected to lines formed on the surface of the circuit board 35 opposed to the bottom substrate 32, by lines formed on the outside of the heat seal connector 36. The top substrate lines 33 are further connected to the display device-side electrode terminals 13 disposed on the opposite surface of the circuit board 35 through through-holes formed therein. The bottom substrate lines 34 formed on the surface of the bottom substrate 32 opposed to the top substrate 31 are electrically connected to lines formed on the surface of the circuit board 35 on which the display device-side electrode terminals 13 are provided, by lines formed on the inside of the heat seal connector 37. The bottom substrate lines 34 are further connected to the display device-side electrode terminals 13. Incidentally, although FIG. 5 shows the top substrate 31, the bottom substrate 32 and the circuit board 35 in a separate form for the purpose of illustration, they are actually disposed in nearly immediate contact with one another as shown in FIG. 4.

This example uses the heat seal connectors 36 and 37 to connect the top substrate 31, the bottom substrate 32 and the circuit board 35, but they can also be connected by a flexible wiring board such as an FPC or by a method such as a combination of an FPC and an ACF (anisotropic conductive film). various circuit boards such as a printed circuit board and a ceramic circuit board can be used as the circuit board 35.

In this example, the top substrate 31 and the bottom substrate 32 need areas for connection to the respective heat seal connectors 36 and 37, but such connection areas may be made very narrow compared to the conventional display system using a card edge connector, whereby the size of the display device 1 can be made smaller than those of the conventional display device while retaining the display area of the image display surface 11.

Figure 6:
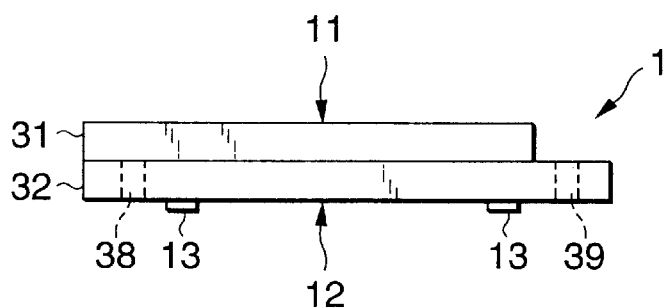
FIG. 6 is a cross-sectional view showing a second example of the display device.

FIG. 6 is a cross-sectional view showing a second example of the display device. In FIG. 6, reference numerals 38 and 39 denote through-holes. In this example, the circuit board 35 is not provided. The surface of the bottom substrate 32 opposed to the top substrate 31 is formed as the reverse surface 12 of the display device 1 opposite to the image display surface 11, and the display device-side electrode terminals 13 are provided on the reverse surface 12. Top substrate lines (not shown) formed on the surface of the top substrate 31 opposed to the bottom substrate 32 are connected to lines formed on the surface of the bottom substrate 32 opposed to the top substrate 31, and are further connected to lines formed on the reverse surface 12 opposite to the image display surface 11 by the through-holes 38 formed in the bottom substrate 32, whereby the top substrate lines 33 can be electrically connected to the display device-side electrode terminals 13. Bottom substrate lines (not shown) formed on the surface of the bottom substrate 32 opposed to the top substrate 31 are similarly connected to the lines formed on the reverse surface 12 opposite to the image display surface 11, by the through-holes 39 formed in the bottom substrate 32, whereby the bottom substrate lines are electrically connected to the display device-side electrode terminals 13. With this construction, it is possible to construct the display device 1 with a size approximately equal to its display area.

The through-holes 38 and 39 formed in the bottom substrate 32 can be formed by forming through-holes, as by laser, and depositing a conductor such as a metal onto the wall surfaces of the through-holes, as by plating or evaporation. Incidentally, a glass substrate, a film substrate or the like can be used as each of the top substrate 31 and the bottom substrate 32. Although the display device 1 is weaker in strength because the circuit board 35 is not provided, a polarizing plate may be provided on the image display surface 11 for reinforcing purpose. Otherwise, the entire display device 1 may be constructed to have flexibility.

Figure 7:
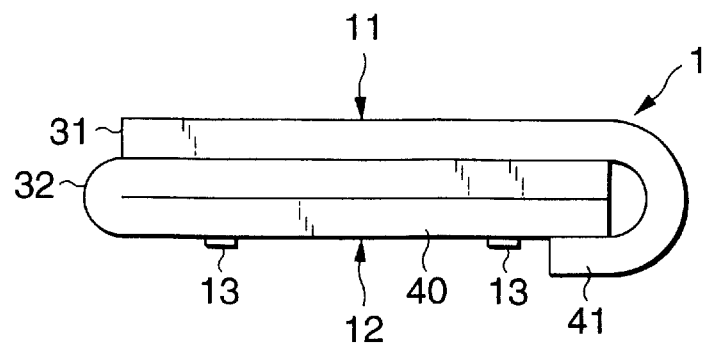
FIG. 7 is a cross-sectional view showing a third example of the display device.

FIG. 7 is a cross-sectional view showing a third example of the display device. In FIG. 7, reference numeral 40 denotes a bottom substrate extending portion and reference numeral 41 denotes a top substrate extending portion. Surfaces on which lines are formed are shown by thick lines. In this example, the top substrate 31 and the bottom substrate 32 are made of a substrate having flexibility such as resin film. The bottom substrate 32 has a length approximately twice a length corresponding to the display area, and bottom substrate lines 34 are formed in an approximately half area of the bottom substrate 32. Electrode terminals to which the bottom substrate lines 34 are extended are formed on the remaining bottom substrate extending portion 40, and the formed electrode terminals are bent approximately in the center thereof so that they are exposed to the outside. Thus, a substrate whose obverse and reverse surfaces are substantially electrically connected to each other can be obtained. The display device-side electrode terminals 13 are provided on the bent bottom substrate extending portion 40.

The top substrate 31 has a length which is slightly longer than the size corresponding to the display area, and the top substrate lines 33 are formed in a display region and are extended to the top substrate extending portion 41. The surface of the top substrate 31 on which the top substrate lines 33 is formed is opposed to the surface of the bottom substrate 32 on which the bottom substrate lines 34 are formed, and liquid crystal (not shown) is sandwiched between both surfaces. The top substrate extending portion 41 is bent toward the reverse surface 12 opposite to the image display surface 11 and is brought into contact with the bottom substrate extending portion 40 to electrically connect the extending portions of the top substrate lines 33 and the lines formed in the bottom substrate extending portion 40 as shown in FIG. 7. Thus, the top substrate lines 33 can be electrically connected to the display device-side electrode terminals 13 provided in the bottom substrate extending portion 40.

Figure 8:
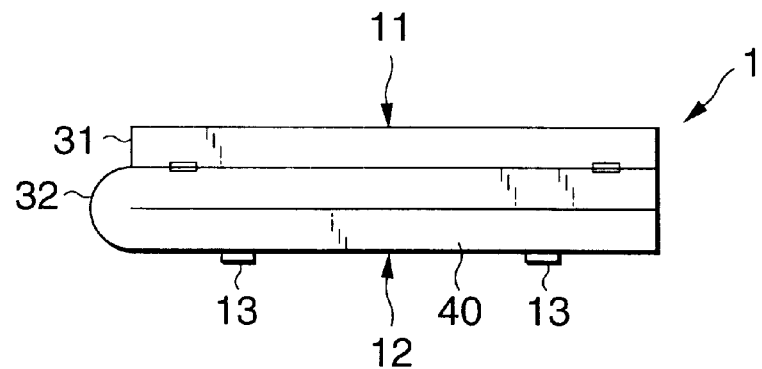
FIG. 8 is a cross-sectional view showing a fourth example of the display device.

FIG. 8 is a cross-sectional view showing a fourth example of the display device. In this example, the top substrate 31 does not have an extending portion like that provided in the third example shown in FIG. 7. The top substrate lines 33 which are formed on the surface of the top substrate 31 opposed to the bottom substrate 32 are brought into contact with lines formed on the surface of the bottom substrate 32 opposed to the top substrate 31. Similarly to the bottom substrate lines 34, the top substrate lines 33 may be extended to the bottom substrate extending portion 40 so that the top substrate lines 33 are electrically connected to the display device-side electrode terminals 13. Incidentally, the surfaces on which the lines are formed are shown by thick lines.

Figure 9:
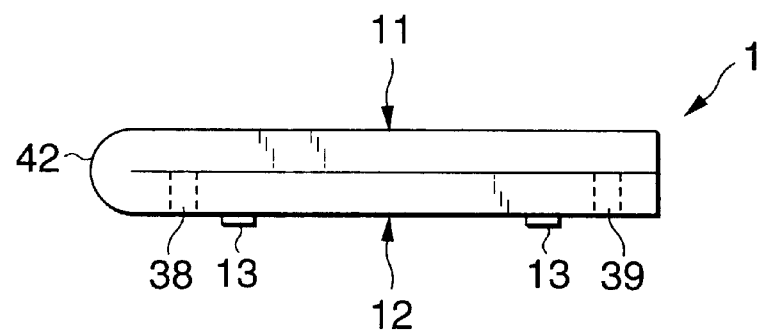
FIG. 9 is a cross-sectional view showing a fifth example of the display device.

FIG. 9 is a cross-sectional view showing a fifth example of the display device. In FIG. 9, reference numeral 42 denotes a transparent substrate. In this example, one transparent substrate 42 serves as both the top substrate 31 and the bottom substrate 32. The transparent substrate 42 is made of a substrate having flexibility such as resin film, and has a size approximately twice the display area. Lines which serve as the top substrate lines 33 are formed on one half of one surface of the transparent substrate 42, while lines which serve as the bottom substrate lines 34 are formed on the other half. The transparent substrate 42 is bent in half, and liquid crystal (not shown) is disposed between the halves. The reverse surface of the portion on which the lines serving as the top substrate lines 33 are formed serves as the image display surface 11. The display device-side electrode terminals 13 are provided on the reverse surface of the region in which the lines serving as the bottom substrate lines 34 are formed.

The top substrate lines 33 and the bottom substrate lines 34 which lie between the halves of the bent transparent substrate 42 can be electrically connected to the display device-side electrode terminals 13 via the through-holes 38 and 39 which are formed in the half region in which the bottom substrate lines 34 are formed similarly to those of the second example as shown in FIG. 9.

Figure 10:
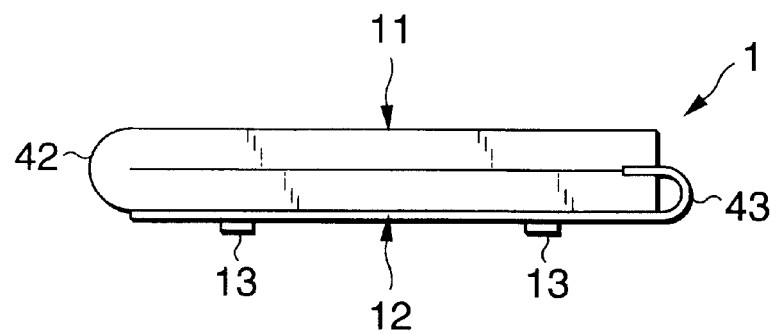
FIG. 10 is a cross-sectional view showing a sixth example of the display device.

FIG. 10 is a cross-sectional view showing a sixth example of the display device. In FIG. 10, reference numeral 43 denotes a double-sided FPC board. In this example, similarly to the transparent substrate 42 of the fifth example shown in FIG. 9, one transparent substrate 42 is bent into two portions corresponding to the top substrate 31 and the bottom substrate 32. To lead out top substrate lines and bottom substrate lines, a double-sided FPC board 43 is inserted between the bent portions of the transparent substrate 42 so that the top substrate lines and the bottom substrate lines are electrically connected. The double-sided FPC board 43 is bent to extend on the reverse surface 12 opposite to the image display surface 11, and the display device-side electrode terminals 13 are provided on the reverse surface of the double-sided FPC board 43 opposite to the surface thereof opposed to the transparent substrate 42. The top substrate lines are led out along the surface of the double-sided FPC board 43 on which the display device-side electrode terminals 13 are provided, and can be directly connected to the display device-side electrode terminals 13. The bottom substrate lines are led out on the surface of the double-sided FPC board 43 opposed to the transparent substrate 42. The bottom substrate lines and the display device-side electrode terminals 13 provided on the opposite surface of the double-sided FPC board 43 may be electrically connected by forming, for example, through-holes in the double-sided FPC board 43. The above-described construction using the double-sided FPC board 43 can be applied to a construction in which the top substrate 31 and the bottom substrate 32 are separated from each other.

Figure 11A:
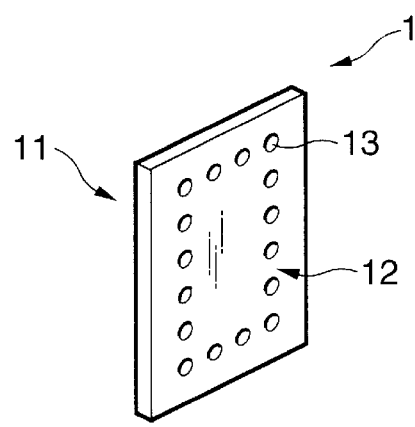
FIGS. 11(A), 11(B) and 11(C) are perspective views showing different examples of the layout of display device-side electrode terminals in the display device.
Figure 11B:
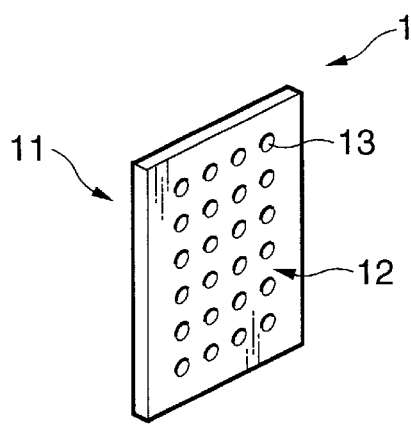
Figure 11C:
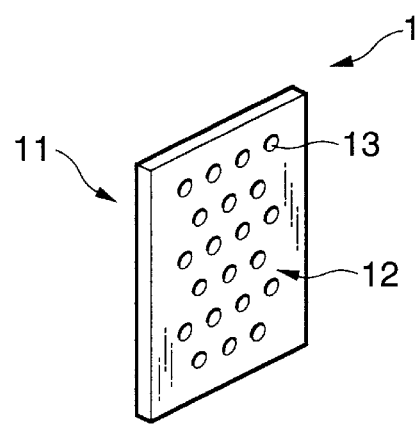

FIGS. 11(A), 11(B) and 11(C) are perspective views showing different examples of the layout of the display device-side electrode terminals in the display device. The lines which are extended from the top substrate lines 33 and the bottom substrate lines 34 to the reverse surface 12 of the display device 1 opposite to the image display surface 11 in the above-described manner are electrically connected to the display device-side electrode terminals 13. The layout of the display device-side electrode terminals 13 provided on the reverse surface 12 of the display device 1 opposite to the image display surface 11 is arbitrary. For example, as shown in FIGS. 1(A) and 1(B), the display device-side electrode terminals 13 may be arranged in one or a plurality of lines near two sides of the display device 1, or they may be arranged in one or a plurality of lines near one or three sides of the display device 1. As shown in FIG. 11(A), the display device-side electrode terminals 13 can also be arranged in one or a plurality of lines along all the four sides of the display device 1. If the number of the display device-side electrode terminals 13 is far larger, the display device-side electrode terminals 13 may be arranged in a grid-like form as shown in FIG. 11(B) or in a staggered state as shown in FIG. 11(C). In the layout shown in FIG. 11(C), since the distance between adjacent ones of the electrode terminals 13 can be made substantially larger, the allowable error of alignment between the display device 1 and the driving device 2 can be made larger, whereby it is possible to easily perform alignment of the display device 1 and the driving device 2.

The layout of the display device-side electrode terminals 13 is not limited to any of these examples, and the display device-side electrode terminals 13 can be arranged in accordance with various layout patterns; for example, the display device-side electrode terminals 13 may be arranged in a concentrated manner in the central portion or in part of the peripheral portion of the display device 1, or may be asymmetrically arranged in order to prevent the display device 1 from being mistakenly attached to the driving device 2 in an erroneous rotational position.

As described above, the display device-side electrode terminals 13 provided on the display device 1 and the driving device-side electrode terminals 22 provided on the driving device 2 are relatively symmetrically arranged so that the display device-side electrode terminals 13 are electrically connected to the driving device-side electrode terminals 22, respectively. However, for example, in order to make the display device 1 compatible with plural kinds of driving devices, electrode terminals which do not correspond to the driving device-side electrode terminals 22 may be provided on the display device 1 as the display device-side electrode terminals 13. Similarly, to make the driving device 2 compatible with plural types of display devices, electrode terminals which do not correspond to the display device-side electrode terminals 13 may be provided on the driving device 2 as the driving device-side electrode terminals 22.

By attaching the display device 1 to the driving device 2, the display device-side electrode terminals 13 are electrically connected to the driving device-side electrode terminals 22, respectively. Since, at this time, electrical connection is provided if the display device-side electrode terminals 13 are respectively brought into contact with the driving device-side electrode terminals 22, it is possible to use electrical connection techniques of the type which does not use soldering in, for example, BGA (Ball Grid Array) which is used as a semiconductor mounting technique. Specifically, the electrode terminals of either one of the display device 1 and the driving device 2 may be formed as metallic projections so that the projecting electrode terminals can be brought into abutment with flat metallic electrode terminals formed on the other. Otherwise, the electrode terminals of both the display device 1 and the driving device 2 may be formed to have projecting shapes so that the electrode terminals of both can be brought into contact with each other.

In addition, the display device 1 and the driving device 2 may be constructed so that when the display device 1 is attached to the driving device 2, not only the above-described electrical connection but also alignment of the display device 1 and the driving device 2 is effected at the same time or the function of securing the display device 1 to the driving device 2 is effected at the same time.

Figure 12:
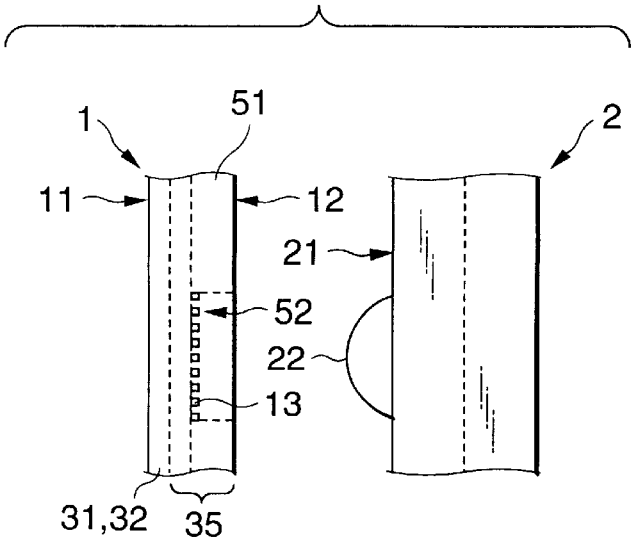
FIG. 12 is an enlarged view showing one example of the shape of each of the display device-side electrode terminals and driving device side electrode terminals.

FIG. 12 is an enlarged view showing one example of the shape of each of the display device-side electrode terminals 13 and the driving device-side electrode terminals 22. In FIG. 12, reference numeral 51 denotes a solder resist, and reference numeral 52 denotes an opening. In this example, the display device 1 has a construction using the circuit board 35 shown in FIGS. 4 and 5. The reverse surface 12 of the circuit board 35 opposite to the image display surface 11 is covered with the solder resist 51 thicker than the display device-side electrode terminals 13. The portions of the solder resist 51 in which the display device-side electrode terminals 13 are disposed are removed, thereby forming the openings 52.

The driving device-side electrode terminals 22 provided on the display device connecting part 21 of the driving device 2 are formed as projections made of conductive resin having flexibility. When the display device 1 is attached to the driving device 2, the projecting driving device-side electrode terminals 22 are fitted into the openings 52 in the display device 1, whereby the display device 1 can be positioned with respect to the driving device 2. Further, when the projecting driving device-side electrode terminals 22 are brought in to contact with or pressed against the display device-side electrode terminals 13 at the bottoms of the respective openings 52, electrical connection between both electrode terminals 13 and 22 is provided. In this example, the display device 1 is secured to the driving device 2 by the securing parts 25 or the like shown in FIG. 1(B) or FIGS. 2(A) and 2(B).

Figure 13A:
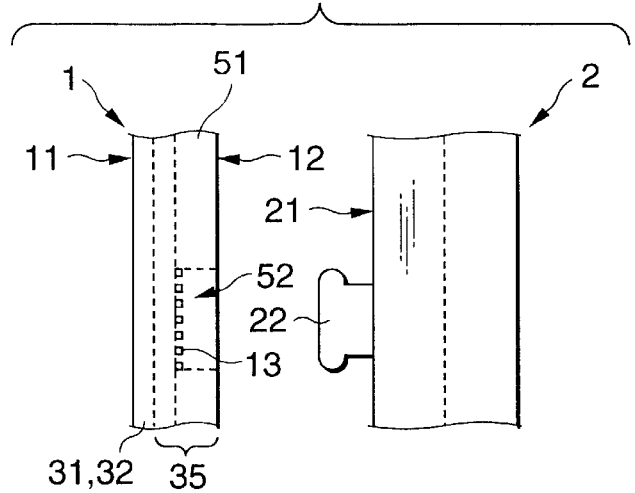
FIGS. 13(A) and 13(B) are enlarged views showing different examples of the shape of each of the display device-side electrode terminals and the driving device-side electrode terminals.

FIGS. 13 (A) and 13(B) are enlarged views showing different examples of the shape of each of the display device-side electrode terminals 13 and the driving device-side electrode terminals 22. In the example shown in FIG. 13(A), unlike the construction shown in FIG. 12, each of the driving device-side electrode terminals 22 is formed to have a shape whose projecting end is enlarged as shown. In the example shown in FIG. 13(A), it is preferable that each of the driving device-side electrode terminals 22 be made of a conductive material having elasticity, for example, conductive rubber, and the width of the enlarged projecting end be made slightly larger than the width of the opening 52 formed in the display device 1.

When the display device 1 is attached to the driving device 2, the respective driving device-side electrode terminals 22 are inserted into and engage with the openings 52 in the display device 1. When the respective driving device-side electrode terminals 22 are inserted into the openings 52, the driving device-side electrode terminals 22 are elastically deformed and the engagement of the driving device-side electrode terminals 22 with the openings 52 is held by elastic force. Accordingly, even in a construction having no securing parts such as the securing parts 25 shown in FIG. 1, the display device 1 can be held and secured by the driving device-side electrode terminals 22 and the openings 52.

Figure 13B:
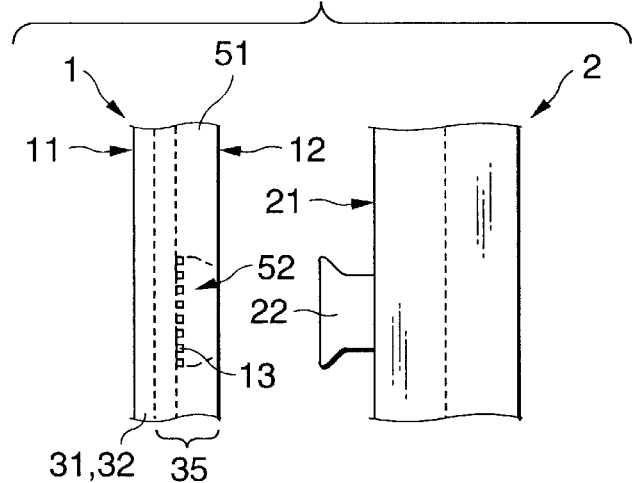

In the example shown in FIG. 13(B), the cross-sectional shape of each of the openings 52 formed in the solder resist 51 on the circuit board 35 of the display device 1 has a shape which becomes gradually wider toward the bottom in the direction of the depth of the opening 52. Similarly, each of the driving device-side electrode terminals 22 has a shape whose projecting end becomes gradually larger according to the cross-sectional shape of the opening 52. When the display device 1 is attached to the driving device 2, the respective driving device-side electrode terminals 22 are inserted into the openings 52 in the display device 1. During insertion, the projecting end of each of the driving device-side electrode terminals 22 is elastically deformed at the entrance portion of the opening 52 and is forced into the opening 52 toward the bottom thereof. After that, the elastic deformation is released to some extent, and the opening 52 and the driving device-side electrode terminal 22 are brought into engagement with each other. In this example, as compared with the construction shown in FIG. 13(A), the holding force can be increased to a further extent.

Incidentally, in a construction like each of the above-described examples, in which projections and recesses are brought into engagement with each other, the relationship between the projections and recesses may be opposite. Specifically, the display device-side electrode terminals 13 may have projecting shapes, and recesses may be formed in the driving device-side electrode terminals 22.

Figure 14:
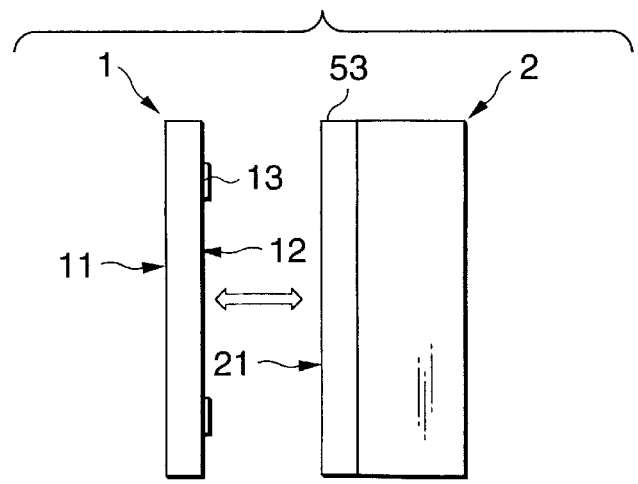
FIG. 14 is a cross-sectional view showing yet another example of the shape of each of the display device-side electrode terminals and the driving device-side electrode terminals.

FIG. 14 is a cross-sectional view showing yet another example of the shape of each of the display device-side electrode terminals 13 and the driving device-side electrode terminals 22. In FIG. 14, reference numeral 53 denotes an anisotropic conductive sheet. The connection between the display device-side electrode terminals 13 and the driving device-side electrode terminals 22 can also be realized via the anisotropic conductive sheet 53. The example shown in FIG. 14 has a construction in which the anisotropic conductive sheet 53 is provided on the display device connecting part 21 of the driving device 2. Of course, the anisotropic conductive sheet 53 may also be provided on the reverse surface 12 of the display device 1 opposite to the image display surface 11. For example, if a sheet having far larger flexibility is used as the anisotropic conductive sheet 53, the influence of warp of either of the display device 1 and the driving device 2 upon the other can be reduced.

In addition, it is possible to apply various known constructions to the form of connection between the display device-side electrode terminals 13 and the driving device-side electrode terminals 22. For example, in each of the above-described constructions, if either or both of the display device-side electrode terminals 13 and the driving device-side electrode terminals 22 are formed by a magnetic substance, the display device-side electrode terminals 13 and the driving device-side electrode terminals 22 can be positioned as well as held and secured by magnetism.

In the above-described manner, in the display device 1, lines for driving elements are extended to the reverse surface 12 opposite to the image display surface 11, and the display device-side electrode terminals 13 are provided on the reverse surface 12 opposite to the image display surface 11, whereby the display device-side electrode terminals 13 can be electrically connected to the corresponding driving device-side electrode terminals 22 by various connecting methods. Thus, it is possible to construct each of the display device 1 and the driving device 2 with a size approximately equal to the image display surface 11.

Figure 15A:
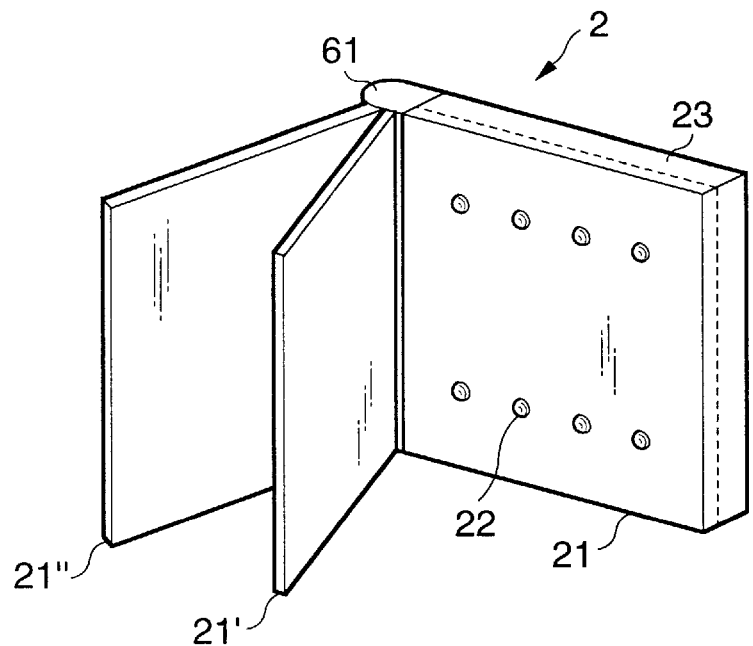
FIGS. 15(A) and 15(B) are perspective views showing another embodiment of the display system according to the present invention.
Figure 15B:
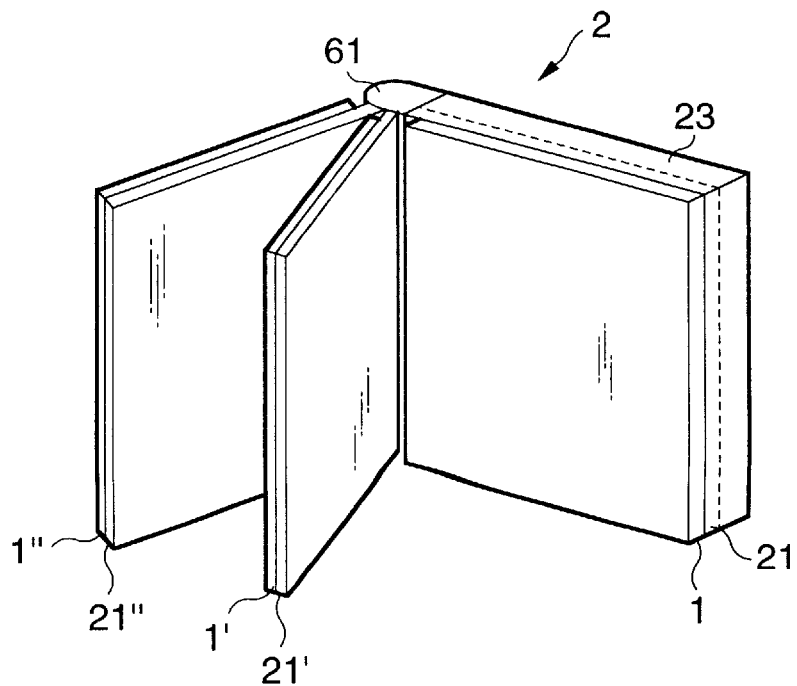

FIGS. 15(A) and 15(B) are perspective views showing another embodiment of the display system according to the present invention. In FIGS. 15(A) and 15(B), reference numeral 61 denotes a movable part. In this embodiment show in FIGS. 15(A) and 15(B), a plurality of display devices can be connected to one driving device 2. As shown in FIG. 15(A), the driving device 2 has a plurality of display device connecting parts 21, 21' and 21". Each of the display device connecting parts 21, 21' and 21" has the driving device-side electrode terminals 22 for connection to the display device 1. The display device connecting parts 21, 21' and 21" are joined together at the movable part 61 and are electrically connected to the driving circuit part 23. The driving circuit part 23 has the function of displaying an arbitrary surface of each of the display device connecting parts 21, 21' and 21" in a book-like manner. Incidentally, the display device connecting part 21 and the driving circuit part 23 may be integrally constructed as shown in FIG. 1 and others.

The display device 1 and display devices 1' and 1" can be arbitrarily attached to or detached from the display device connecting parts 21, 21' and 21". In the example shown in FIG. 15(B), the display devices 1, 1' and 1" are respectively attached to the display device connecting parts 21, 21' and 21". The construction of each of the display devices 1, 1' and 11" and the form of connection between each of the display device connecting parts 21, 21' and 21" and the corresponding one of the display devices 1, 1' and 1" are similar to those used in the above-described embodiment and various constructions can be used for the display devices 1, 1' and 1" and the display device connecting parts 21, 21' and 21".

The driving circuit part 23 has a mechanism for switching over image data to be supplied to the display device connecting parts 21, 21' and 21", and is capable of displaying an image on a desired display device via an arbitrary display device connection part and of handling a plurality of display devices at the same time.

Incidentally, although the embodiment shown in FIGS. 15(A) and 15(B) is provided with three display device connecting parts 21, the number of display device connecting parts is arbitrary and two or more than three display device connecting parts may also be provided.

Figure 16:
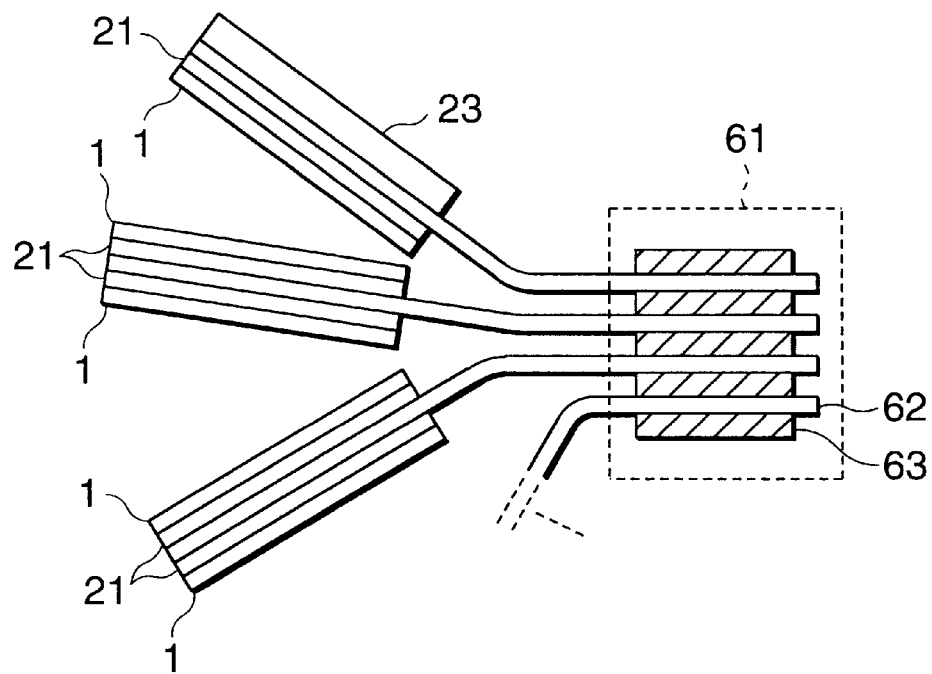
FIG. 16 is a cross-sectional view showing one example of the construction of a movable part for realizing the embodiment, shown in FIGS. 15(A) and 15(B), of the display system according to the present invention.
Figure 17:
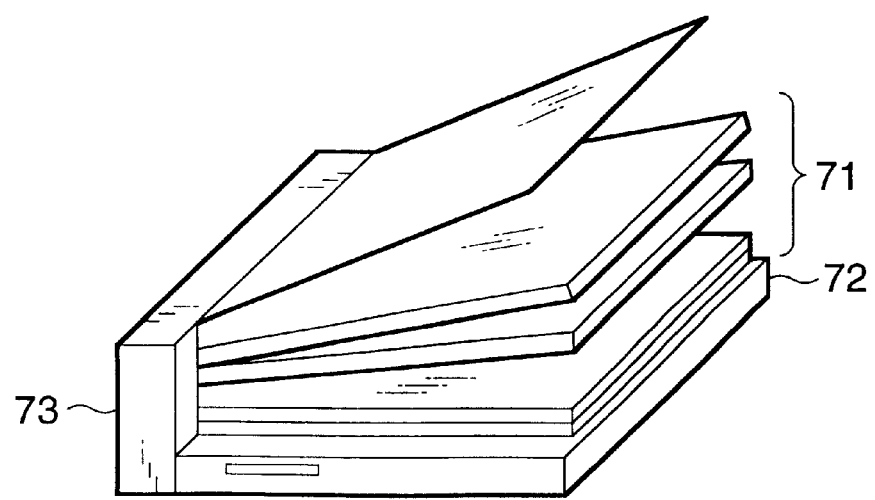
FIG. 17 is an explanatory view showing one example of a conventional display system.
Figure 18:
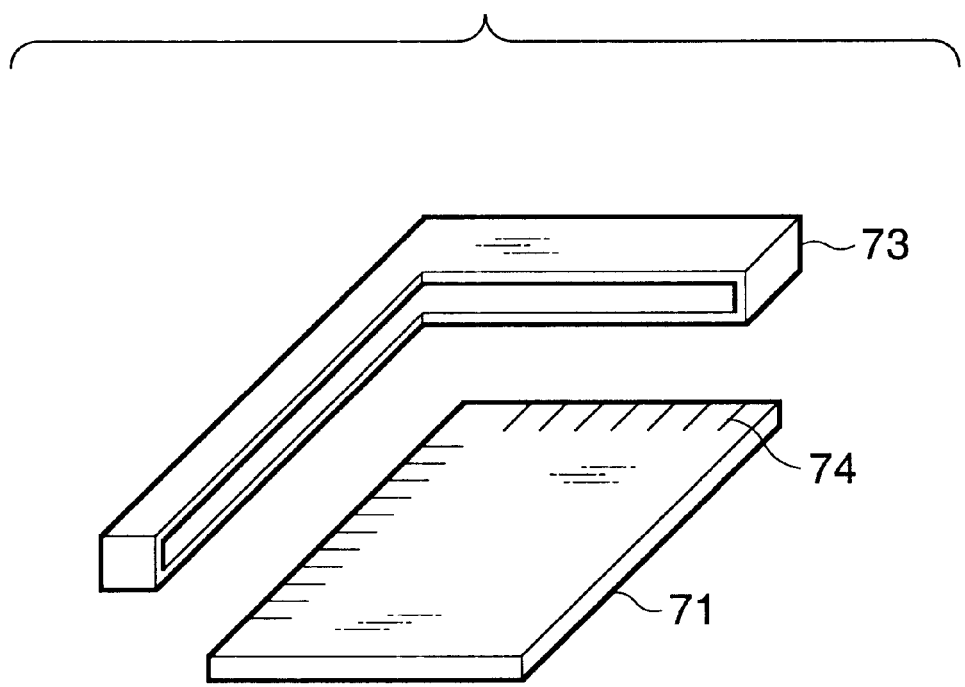
FIG. 18 is a perspective view showing one example of electrical connection means for a display device and a driving devices in one example of the conventional display system.

FIG. 16 is a cross-sectional view showing one example of the construction of the movable part 61 for realizing the above-described embodiment of the display system according to the present invention. In FIG. 16, reference numeral 62 denotes film substrates and reference numeral 63 denotes circuit boards. The movable part 61 can use a construction in which the film substrates 62 and the circuit boards 63 are stacked as shown in FIG. 16, for example, a flex-rigid PWB system. Each of the circuit boards 63 provides electrical connection between two film substrates 62, and this stacked structure enables selective electrical connection between the individual film substrates 62.

The display device connecting part 21 can be formed by each of the film substrates 62 or by forming a circuit board on each of the film substrates 62. In the example shown in FIG. 16, circuit boards are formed on both sides of each of the film substrates 62 to constitute the display device connecting part 21. Of course, the display device connecting part 21 may be provided on only either surface of each of the film substrates 62. The display device 1 can be attached to and detached from each of the display device connecting parts 21. In addition, in this example, a circuit board which forms the driving circuit part 23 is provided on one of the film substrates 62.

In the above-described construction, each of the display device connecting parts 21 can be rotated with respect to the movable part 61 by virtue of the flexibility of the corresponding one of the film substrates 62. Accordingly, a user can refer to the displayed contents of each of the display devices 1 while moving the display device connecting parts 21 to which the display devices 1 are attached, as if the user were turning the pages of an actual book.

In the description of each of the above-described examples, reference has chiefly been made to a simple matrix addressing type of ferroelectric liquid crystal display, but the present invention is not limited to only the simple matrix addressing type. For example, the present invention can be applied to an addressing system other than simple matrix addressing represented by TFT addressing, and can be similarly applied to a liquid crystal display system other than ferroelectric liquid crystal displays or a display system other than liquid crystal displays. For example, the present invention can also be applied to a display system which displays an image by rotating capsules corresponding to individual display pixels.

As is apparent from the foregoing description, in accordance with the present invention, it is possible to provide, as a display system in which a flat display and its driving part can be separated from each other, a small display system in which the area of each of a display device and a driving device is approximately equal to an image display part. In addition, it is possible to provide a display device which can easily be manufactured without the need for wear resistance treatment at its electrode terminal portion as well as a driving device which can easily be manufactured and connected to the display device. Furthermore, the present invention has the effect of providing a display system in which since a multiplicity of electrode terminals can be arranged within a wide image display area as required, the pitch of the electrode terminals can be made large and a display device can easily be aligned with a driving device when the display device and the driving device are attached to or detached from each other.

What is claimed is:

1. A display system comprising:
   a flat display device having an image display part; and
   a driving device having a driving circuit for displaying an image on said display device,
   said display device and said driving device being constructed to be detachably attached to each other,
   wherein an electrode terminal of said display device for electrically connecting said display device and said driving device is disposed on the reverse surface of said display device opposite to said image display part.

2. A display system according to claim 1, wherein said display device is made of a display having memory characteristics for holding a displayed image even if said display device is electrically disconnected from said driving device.

3. A display system according to claim 2, wherein said display is a ferroelectric liquid crystal display.

4. A display system according to claim 1, wherein said electrode terminal of said display device and said electrode terminal of said driving device are disposed in a grid-like form.

5. A display system according to claim 1, wherein said display device includes:
   a top substrate and a bottom substrate which constitute said image display part; and
   a circuit board of the reverse surface of said display device opposite to said image display part,
   said top substrate and said bottom substrate being electrically connected to said circuit board and said electrode terminal of said display device being provided on said circuit board.

6. A display system according to claim 1, wherein said display device includes a top substrate and a bottom substrate which constitute said image display part, and each of said top substrate and said bottom substrate is a double-sided substrate, said electrode terminal of said display device being provided on a surface of said bottom substrate which corresponds to the reverse surface of said display device opposite to said image display part, and said electrode terminal of said display device and lines provided on said top substrate and said bottom substrate being electrically connected by through-holes provided in said bottom substrate.

7. A display system according to claim 1, wherein said display device includes a top substrate and a bottom substrate which constitute said image display part, and each of said top substrate and said bottom substrate is a resin film substrate having flexibility.

8. A display system according to claim 1, wherein said display device has flexibility which makes said display device bendable.

9. A display system according to claim 1, wherein said display device includes a top substrate and a bottom substrate which constitute said image display part, and each of said top substrate and said bottom substrate is a film substrate having flexibility, said bottom substrate having an extending portion which is bent to extend to the reverse surface of said display device opposite to said image display part, said electrode terminal of said display device being formed on a surface of said extending portion which corresponds to the reverse surface of said display device opposite to said image display part, said top substrate being bent at its end and electrically connected to the surface of said extending portion on which said electrode terminal of said display device is formed.

10. A display system according to claim 1, wherein an anisotropic conductive sheet is disposed on at least either of said surface on which said electrode terminal of said display device is formed and said surface on which said electrode terminal of said driving device is formed.

11. A display system according to claim 10, wherein said anisotropic conductive sheet has flexibility.

12. A display system comprising:
   a flat display device having an image display part; and
   a driving device having a driving circuit for displaying an image on said display device,
   said display device and said driving device being constructed to be detachably attached to each other,
   wherein an electrode terminal of said driving device for electrically connecting said display device and said driving device is disposed flatly and relatively symmetrically to said electrode terminal of said display device.

13. A display system according to claim 12, wherein said electrode terminal of said display device and said electrode terminal of said driving device are disposed in a grid-like form.

14. A display system comprising:
   a flat display device having an image display part; and
   a driving device having a driving circuit for displaying an image on said display device,
   said display device and said driving device being constructed to be detachably attached to each other,
   wherein an electrode terminal of said display device for electrically connecting said display device and said driving device is disposed on the reverse surface of said display device opposite to said image display part, while an electrode terminal of said driving device for electrically connecting said display device and said driving device is disposed flatly and relatively symmetrically to said electrode terminal of said display device, said display device and said driving device being aligned to each other to electrically connect both electrode terminals and cause said display device to display an image.

15. A display system according to claim 14, wherein said driving device includes:

a plurality of display device connection parts each having an electrode terminal for electrical connection to said display device; and a driving circuit part having a driving circuit common to said plurality of display device connection parts.

16. A display system according to claim 14, wherein said driving device includes:

a plurality of display device connection parts each having an electrode terminal for electrical connection to said display device; and a driving circuit part including:

a driving circuit common to said plurality of display device connection parts; and a switching circuit for switching over said plurality of display device connection parts to which to transmit image data to be displayed on said display device.

17. A display system according to claim 14, wherein said display device is made of a display having memory characteristics for holding a displayed image even if said display device is electrically disconnected from said driving device.

18. A display system according to claim 17, wherein said display is a ferroelectric liquid crystal display.

19. A display system according to claim 14, wherein either one of said electrode terminal of said display device and said electrode terminal of said driving device is formed to have a projecting shape.

20. A display system according to claim 14, wherein both said electrode terminal of said display device and said electrode terminal of said driving device are formed to have projecting shapes, respectively.

21. A display system according to claim 19, wherein said electrode terminals each having said projecting shape have flexibility.

22. A display system according to claim 20, wherein said electrode terminals each having said projecting shape have flexibility.

23. A display system according to claim 14, wherein said electrode terminal of said display device and said electrode terminal of said driving device are disposed in a grid-like form.

24. A display system according to claim 14, further comprising securing means for securing said electrode terminal of said display device and said electrode terminal of said driving device to each other after said electrode terminal of said display device and said electrode terminal of said driving device are aligned with each other.

25. A display system according to claim 24, wherein said securing means does not cover the image display part of said display device.

* * * * *